US012380331B2

(12) United States Patent
Song et al.

(10) Patent No.: US 12,380,331 B2
(45) Date of Patent: Aug. 5, 2025

(54) ADAPTIVE HIGH-PRECISION COMPRESSION METHOD AND SYSTEM BASED ON CONVOLUTIONAL NEURAL NETWORK MODEL

(71) Applicants: Chongqing University, Chongqing (CN); University of Electronic Science and Technology of China, Chengdu (CN); Dibi (Chongqing) Intelligent Technology Research Institute Co., Ltd., Chongqing (CN); Star Institute of Intelligent Systems, Chongqing (CN)

(72) Inventors: Yongduan Song, Chongqing (CN); Feng Yang, Chongqing (CN); Rui Li, Chongqing (CN); Shengtao Pan, Chongqing (CN); Siyu Li, Chongqing (CN); Yiwen Zhang, Chongqing (CN); Jian Zhang, Chongqing (CN); Zhengtao Yu, Chongqing (CN); Shichun Wang, Chongqing (CN)

(73) Assignees: Chongqing University, Chongqing (CN); University of Electronic Science and Technology of China, Chengdu (CN); Dibi (Chongqing) Intelligent Technology Research Institute Co., Ltd., Chongqing (CN); Star Institute of Intelligent Systems, Chongqing (CN)

( * ) Notice: Subject to any disclaimer, the term of this patent is extended or adjusted under 35 U.S.C. 154(b) by 983 days.

(21) Appl. No.: 17/448,934

(22) Filed: Sep. 27, 2021

(65) Prior Publication Data
US 2022/0351043 A1   Nov. 3, 2022

(30) Foreign Application Priority Data
Apr. 30, 2021   (CN) .......................... 202110482445.8

(51) Int. Cl.
*G06N 3/082*   (2023.01)
*G06N 3/045*   (2023.01)

(52) U.S. Cl.
CPC ............. *G06N 3/082* (2013.01); *G06N 3/045* (2023.01)

(58) Field of Classification Search
CPC .............................................. G06N 3/02–105
See application file for complete search history.

(56) References Cited

U.S. PATENT DOCUMENTS

| 11,200,497   | B1 * | 12/2021 | Yan ........................ G06N 3/045 |
| 2020/0104717 | A1 * | 4/2020  | Alistarh ................. G06N 3/045 |
| 2020/0402300 | A1 * | 12/2020 | Ding ........................ G06N 3/08 |

FOREIGN PATENT DOCUMENTS

CN           108334934 A   *   7/2018   ............... G06N 3/04

OTHER PUBLICATIONS

Luo, Jian-Hao, and Jianxin Wu. "An entropy-based pruning method for cnn compression." arXiv preprint arXiv:1706.05791 (2017). (Year: 2017).*

(Continued)

*Primary Examiner* — Liang Y Li
(74) *Attorney, Agent, or Firm* — DLA PIPER LLP (US)

(57) ABSTRACT

The present disclosure discloses an adaptive high-precision compression method and system based on a convolutional neural network model, and belongs to the fields of artificial intelligence, computer vision, and image processing. According to the method of the present disclosure, coarse-grained pruning is performed on a neural network model by using a differential evolution algorithm first, and the coarse-grained space is quickly searched through an entropy importance criterion and an objective function with good guidance to obtain a near-optimal neural network structure. Then fine-grained search space is built on the basis of an optimal individual obtained from the coarse-grained search, and (Continued)

fine-grained pruning is performed on the neural network model by a differential evolution algorithm to obtain a network model with an optimal structure. Finally, the performance of the optimal model is restored by using a multi-teacher multi-step knowledge distillation network to reach the precision of an original model.

4 Claims, 5 Drawing Sheets

(56) References Cited

OTHER PUBLICATIONS

Tonechas. What is the Entropy of an Image? May 13, 2018. StackOverflow.com <https://stackoverflow.com/questions/50313114/what-is-the-entropy-of-an-image-and-how-is-it-calculated> (Year: 2018).*

Guo, Xin, et al. "Group-level emotion recognition using hybrid deep models based on faces, scenes, skeletons and visual attentions." Proceedings of the 20th ACM international conference on multimodal interaction. 2018. (Year: 2018).*

* cited by examiner

| Network layer | Type | Convolution kernel, channel, number |
|---|---|---|
| Input layer (224 × 224 × 3) | | |
| Convolutional layer 1 | Convolution | 7 × 7, 64, 1 |
| Maximum pooling layer 1 | | |
| Convolutional layer 2 | Convolution | 1 × 1  64<br>3 × 3  64, 3<br>1 × 1  256 |
| Maximum pooling layer 2 | | |
| Convolutional layer 3 | Convolution | 1 × 1  128<br>3 × 3  128, 8<br>1 × 1  512 |
| Maximum pooling layer 3 | | |
| Convolutional layer 4 | Convolution | 1 × 1  256<br>3 × 3  256, 36<br>1 × 1  1024 |
| Maximum pooling layer 4 | | |
| Convolutional layer 5 | Convolution | 1 × 1  512<br>3 × 3  512, 3<br>1 × 1  2048 |
| Maximum pooling layer 5 | | |
| Fully connected layer 1-4096 | | |
| Fully connected layer 2-4096 | | |
| Fully connected layer 3-7 | | |

FIG. 4

ADAPTIVE HIGH-PRECISION COMPRESSION METHOD AND SYSTEM BASED ON CONVOLUTIONAL NEURAL NETWORK MODEL

CROSS REFERENCE TO RELATED APPLICATION(S)

This application claims priority to Chinese Patent Application No. 202110482445.8, filed Apr. 30, 2021, which is herein incorporated by reference in its entirety.

TECHNICAL FIELD

The present disclosure relates to the fields of artificial intelligence, computer vision, and image processing, and particularly relates to an adaptive high-precision compression method and system based on a convolutional neural network model.

BACKGROUND ART

With the development of artificial intelligence technology, image classification, target detection and the like based on deep learning have achieved significant development in actual application scenarios. However, as the precision of a neural network model improves, the structure of the model becomes deeper and more complex, there are more parameters, and the inference speed becomes slower, which greatly limits the deployment of the neural network model on an embedded platform and inference, thus severely restricting the application of most network models.

The model compression of deep learning is a collective term for multiple technologies, mainly including pruning, quantification, knowledge distillation, and the like, among which model pruning and knowledge distillation are more widely used. However, for the current model compression, pruning often relies on setting a fixed threshold value, and knowledge distillation relies on a well-designed network model, which will cause the precision during the model compression to drop dramatically. Conversely, the model precision may not be able to be improved. Moreover, it requires high experience and has no universality. In addition, the current model compression generally aims to reduce the number of parameters, taking less account of the operational speed and accuracy of the model, and is difficult to deploy on embedded devices with limited computing resources and memory resources.

Therefore, how to adaptively perform model compression while maintaining the precision of an original model and invent a more universal and intelligent model compression method to achieve more efficient model compression is a problem that needs to be considered and urgently solved in the current model compression.

SUMMARY

Based on the background above, embodiments of the present disclosure provide an adaptive high-precision compression method and system based on a convolutional neural network model, so as to improve the defects in convolutional neural network model compression of existing methods.

In order to achieve the objective above, embodiments of the present disclosure adopt the following technical solution which is an adaptive high-precision neural network compression system, including: a channel importance computation module, a coarse-grained pruning module, a fine-grained pruning module, and a multi-step distillation module.

An input of the channel importance computation module includes original optimal neural network parameters, and an output includes the importance of each channel of an original optimal neural network; inputs of the coarse-grained pruning module are network parameters of the original optimal neural network and the output of the channel importance computation module respectively, and an output of the coarse-grained pruning module are optimal neural network parameters that are preliminary compressed; an input of the fine-grained pruning module is the outputs of the channel importance computation module and the coarse-grained pruning module, and an output of the fine-grained pruning module is optimal neural network parameters that are further compressed; and an input of the multi-step distillation module is the output of the fine-grained pruning module, and an output of the multi-step distillation module is optimal neural network parameters that have been compressed.

Further, a computation method in the channel importance computation module is:

selecting an entropy as an evaluation criterion for the importance of the channel; the entropy of each output channel of each layer of an original model is calculated through an inference process, and the definition of the channel entropy is as shown in Formula (1);

$$H = \Sigma_{i=0}^{255} p_i \log p_i \quad (1)$$

where $p_i$ represents a ratio of the number of values within a range of $[i, i+1]$ in the channel to the total number of values in the channel.

Further, a computation method in the coarse-grained pruning module is:

S11: setting the maximum value and the minimum value of search space for each layer of neural network according to a data set and prior knowledge, and making 4 equal divisions, or 8 equal divisions, or 16 equal divisions within the set value range, where the form of the search space is coarse_space=$[c_1, c_2, \ldots, c_i, \ldots, c_n]$, $c_i$ represents the search range of the ith layer, with a form of $c_i=[c_{i1}, c_{i2}, \ldots, c_{ij}, \ldots, c_{im}]$, and $c_{ij}$ represents the number of the jth channels in the ith layer;

S12: setting an objective function as shown in Formula (2):

$$f(C) = \text{argmin}_C \left( \alpha_1 \left(1 - acc(N(C, D_{train}), D_{test}) + \alpha_2 \frac{\|P_{cur}\|}{\|P_{org}\|} + \alpha_3 \frac{M_{cur}}{M_{org}} \right) \right) \quad (2)$$

where $acc(N(C, D_{train}), D_{test})$ represents the accuracy of a pruning network with a channel structure C tested on a test data set $D_{test}$ after being trained on a train data set $D_{train}$; $M_{cur}$ and $P_{cur}$ respectively represent the number of computational operations and the number of parameters of a model with a channel structure C, $M_{org}$ and $P_{org}$ respectively represent number of computational operations and the number of parameters of the original model; the specific form of the channel structure C is $[c_1, c_2, \ldots, c_n]$, where $c_i$ represents the number of channels in the ith layer; $\alpha_1$, $\alpha_2$, and $\alpha_3$ respectively represent the preferences of the error rate, the number of parameters and the number of computational operations, and the sum of these three coefficients is 1, as shown in formula (3); and $$\alpha_1 + \alpha_2 + \alpha_3 = 1 \quad (3)$$

S13: generating a variant individual through the changing trend of optimal three individuals and an optimal individual, and obtaining a global optimum through a local optimum, wherein the variant individual is generated as shown in Formulas (4) and (5);

$$\begin{cases} h_d = m_{f_{min}} - m_{f_{mid}} \\ l_d = m_{f_{mid}} - m_{f_{max}} \\ mask = h_d * l_d \end{cases} \quad (4)$$

$$h = \begin{cases} m_{f_{min}} + s, & \text{if } mask > 0 \text{ and } h_d > 0 \\ m_{f_{min}} - s, & \text{if } mask > 0 \text{ and } h_d < 0, \\ m_{f_{min}} + randn, & \text{if } mask < 0 \end{cases} \quad (5)$$

where $m_{fmin}$, $m_{fmid}$, and $m_{fmax}$ represent three individuals with the lowest fitness value in a current population, and the change trend of the population and the generation of the variant individual h are determined by the three; s represents a channel change scale of each layer, which is set according to the number of equal divisions in a specific form $[s_1, s_2, \ldots, s_i, \ldots, s_n]$, and $s_i$ represents a change scale of the ith layer; and randn represents a random value in the search space;

S14: performing adaptive structure search pruning according to the coarse-grained search space, the objective function and the evolution mode determined from S11 to S13.

Further, a computation method in the fine-grained pruning module is: to further reduce the range of the search space, and set both a search range granularity and a change scale in a variation process to 1, where the search space of fine-grained pruning is to select channel structures of optimum three individual in coarse-grained pruning to rebuild, and find the maximum value and the minimum value of the number of channels in each layer of the three structures as a search range; and optimum three models of coarse-grained pruning are selected as initial parents of fine-grained pruning, and then adaptive structure search is performed in the search space of fine-grained pruning to obtain an optimal model.

Further, a computation method in the multi-step distillation module is:

S21: using an optimal model of fine-grained pruning as a student model $N_s$, using a pruned network model generated in each generation except the optimal model and an original model as teacher models, and using the teacher model to supervise the student model for knowledge distillation network training;

S22: in the knowledge distillation training, using the teacher models selected to participate in the knowledge distillation training in multiple steps in sequence, wherein there is only one teacher model in the network at a time, and after one stage of training is completed, the teacher model is replaced to perform the knowledge distillation network again; in the knowledge distillation network training, the teacher models selected participate in the training according to an established sequence, and the original model is the last one; the sequence is in a descending order based on the objective function (2) of pruning; a loss function of the knowledge distillation training is as shown in Formula (6);

$$L = \lambda \cdot T^2 \cdot L_{soft} + (1-\lambda) L_{hard} \quad (6)$$

where $\lambda$ is a weight coefficient, T is a temperature, $L_{soft}$ is a loss between the student model and the teacher model, and $L_{hard}$ is a loss between the student model and a truth label.

Provided is a facial expression recognition method using a neural network compression system, the model compression method including:

step 1: obtaining sample images, marking facial expressions to be recognized in the sample images, and dividing the sample images into a train set and a test set;

step 2: performing scaling, rotation, cropping, and normalization operations on the sample images, and then unify image sizes;

step 3: building a facial expression recognition neural network, where the neural network has more than 40 layers, and a neural network combining VGG and Resnet is used;

step 4: training the neural network built in step 3 with the sample images obtained in step 2 to obtain an original neural network;

step 5: compressing the original neural network obtained in step 4 with the neural network compression system; and step 6: performing facial expression recognition with the neural network that has been compressed in step 5.

Embodiments of present disclosure have the advantages that first, by designing the objective function with good guidance, the model generated by the structure search pruning can have good compression rate and acceleration effect, and second, through the coarse-grained and fine-grained two-stage structure search pruning, an optimal model structure is obtained, and finally, the accuracy of the network model after pruning is restored by the knowledge distillation method. Multiple teacher models are used to supervise the student model in multiple steps for knowledge distillation training, which avoids that the distilled 'knowledge' is too smooth when multiple teacher models participate in the training at the same time, and meanwhile, and different network structure 'knowledge' brought by different teacher models is retained, such that the student model can learn the advantages of each teacher model to further improve the performance.

BRIEF DESCRIPTION OF THE DRAWINGS

FIG. 4 is a structural diagram of a facial expression recognition network.

DETAILED DESCRIPTION OF THE EMBODIMENTS

In order to introduce the features and technical content of the preferred embodiments of the present disclosure in more detail, the implementation of the preferred embodiments will be described in detail below with reference to the accompanying drawings. The preferred embodiments are only for illustrating the present disclosure, instead of limiting the protection scope of the present disclosure.

According to a compression method based on a neural network model provided by a preferred embodiment, provided is a brand-new adaptive high-precision model compression mode, which aims to automatically perform coarse-grained and fine-grained structure search pruning to obtain an optimal model structure through differential evolution, and improve the precision of the pruned model through multi-teacher distillation. First, a near-optimal neural network structure is quickly obtained by coarse-grained search pruning, then an optimal neural network structure is obtained by fine-grained structure search pruning, and finally the precision of the optimal structure is improved through multi-teacher knowledge distillation. The method can reduce the number of parameters and the number of computational operations of the compression model to a certain extent, while ensuring that the precision is not reduced or becomes higher, and the method can automatically perform pruning and knowledge distillation without excessive human experience and other rule constraints.

An adaptive high-precision neural network compression method and system provided by the preferred embodiment will be described in detail below in conjunction with the accompanying drawings 1-7.

Embodiment 1: an adaptive high-precision neural network compression system

Figure 1:
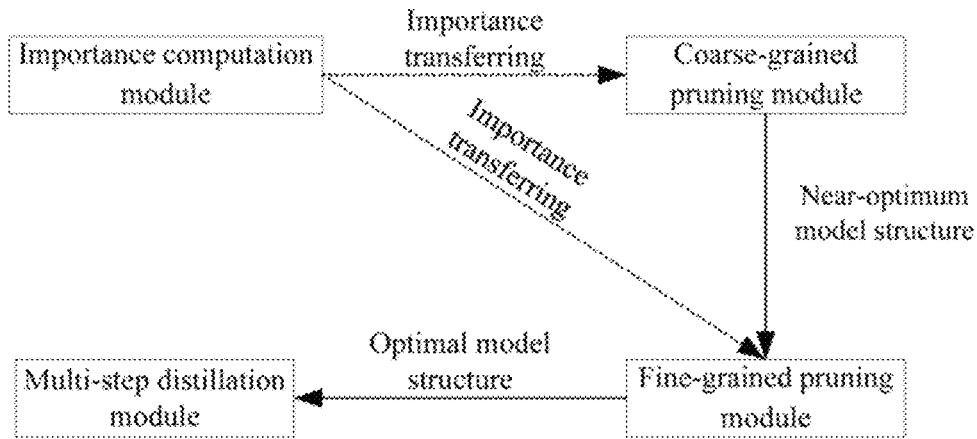
FIG. 1 is a schematic diagram of an adaptive high-precision compression system based on a convolutional neural network model.

The adaptive high-precision neural network compression system is composed of a channel importance computation module, a coarse-grained pruning module, a fine-grained pruning module, and a multi-step distillation module, as shown in FIG. 1.

Importance computation module: an original model is trained on a train data set, and the importance of each channel of each layer of the original model is calculated on an importance evaluation data set.

Coarse-grained pruning module: according to a designed differential evolution pruning algorithm, structure search pruning is performed in coarse-grained search space to obtain a near-optimal model structure. By utilizing the fast convergence property of the differential evolution algorithm, on the basis of an original network model structure, coarse-grained structure search pruning is performed. By designing an objective function with good guidance, all models generated by the structure search have better compression rates, accelerated computation speed, and the like. At the same time, coarse-grained restriction on the search space can speed up the search process to quickly approach an optimal model structure. Finally, the evolution mode of the differential evolution algorithm is optimized to improve its convergence speed. In addition, in order to ensure that the structure search pruning can obtain the optimal model and to ensure a higher precision, the present disclosure adopts a coarse-grained and fine-grained two-stage structure search pruning method to obtain an optimal structure, and finally the precision of the optimal structure is improved through a multi-teacher and multi-step distillation mode.

Fine-grained pruning module: according to a designed differential evolution pruning algorithm, fine-grained structure search is performed on the basis of coarse-grained pruning to obtain the optimal model structure.

Multi-step distillation module: according to a designed multi-step multi-teacher distillation method, knowledge distillation is performed on the optimal model structure obtained by pruning to obtain a compression model with improved precision.

Embodiment 2: A facial expression recognition method using adaptive high-precision convolutional neural network compression A facial expression recognition network is built and trained; and the basic flow is as follows.

A natural facial expression data sets are selected as a train set and a test set.

Sample images are pre-processed, including scaling, rotation, cropping, and normalization operations, and then image sizes are unified into 224×224×3.

A facial expression recognition network is built under a Pytorch frame. The designed network includes a total of 51 convolutional layers, 5 maximum pooling layers, and 3 fully connected layers, and finally 7 expression types are output. A network structure table is as shown in FIG. 4.

The preprocessed train data is put into the designed facial expression recognition network for network training to obtain a high-precision original model.

The original neural network is compressed by using a model compression system. The compression method is as follows.

Figure 2:
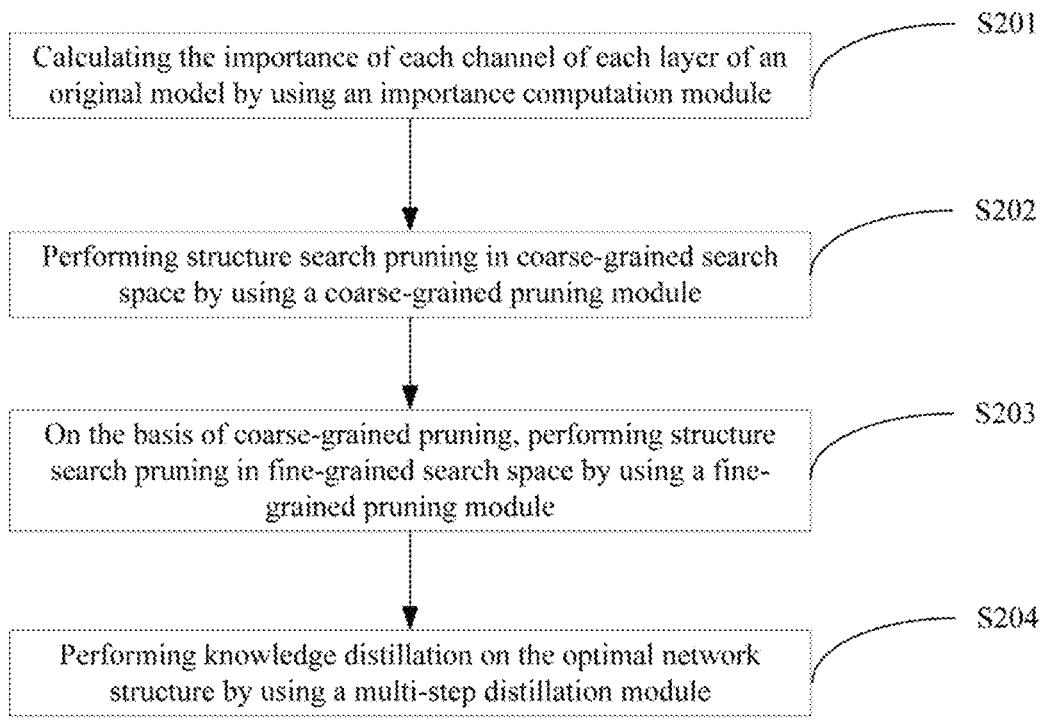
FIG. 2 is a flow chart of an adaptive high-precision compression method based on a convolutional neural network model.

Referring to FIG. 2, the method specifically includes the following steps:

S201. The importance of each channel of each layer of an original model is calculated by using an importance computation module.

The original model is trained on a train data set to obtain a high-precision original model.

Figure 3:
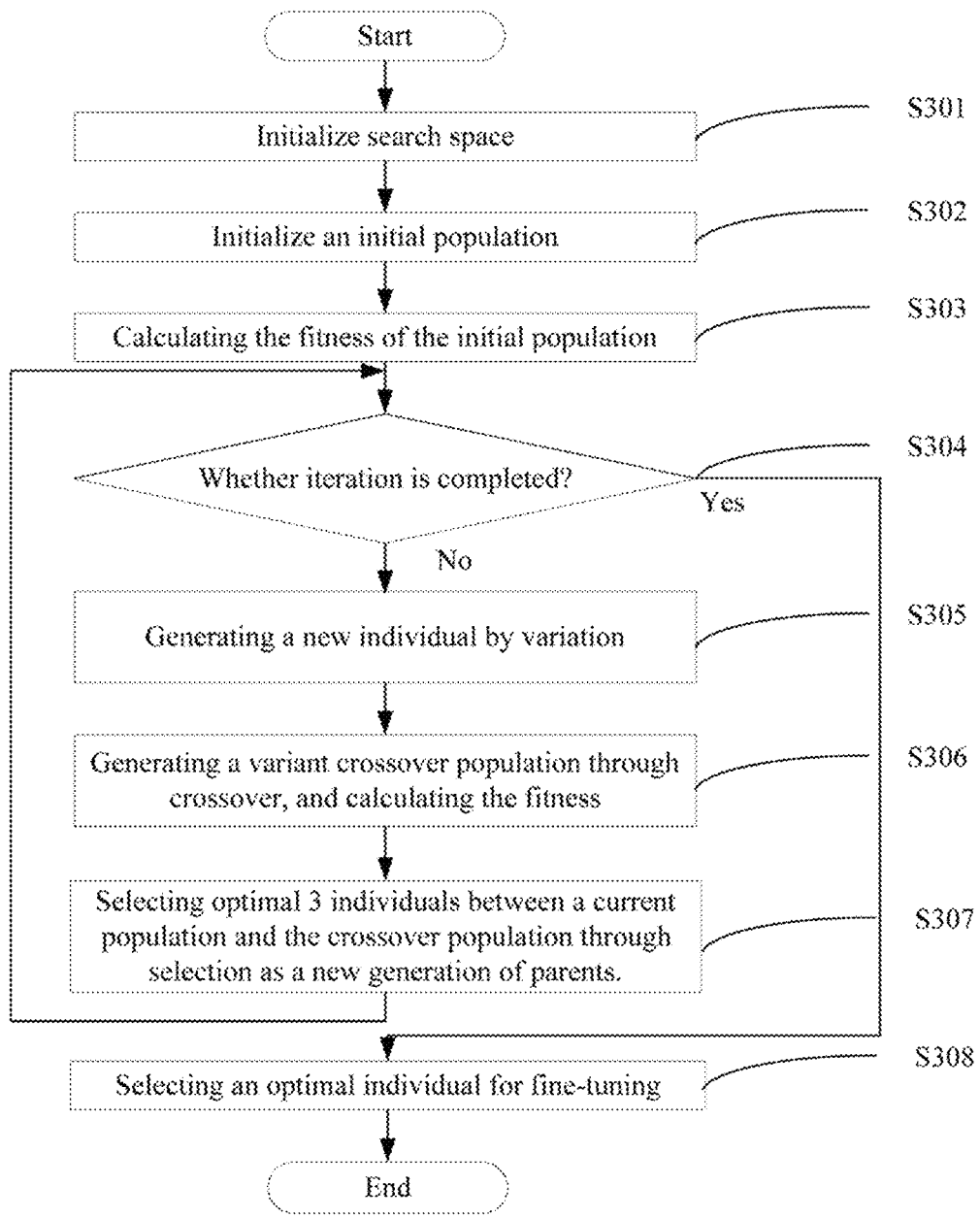
FIG. 3 is a flow chart of adaptive structure search pruning.
Figure 5:
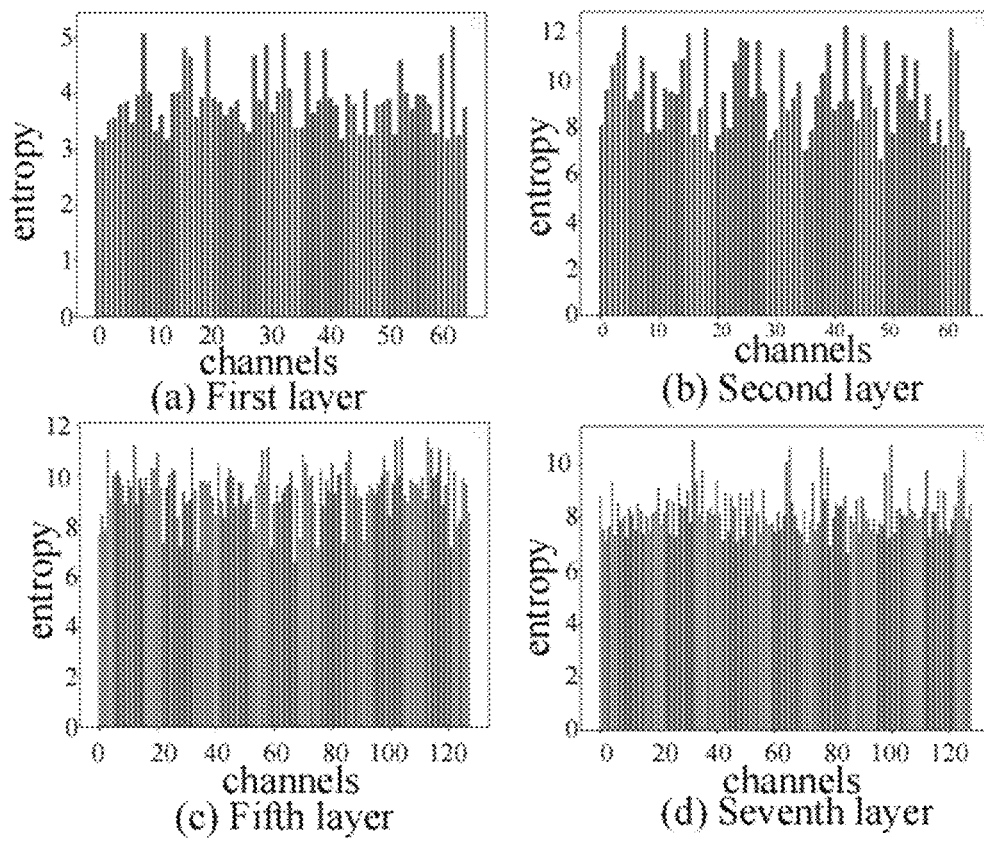
FIG. 5 shows a channel entropy of some layers of a facial expression recognition original model.
Figure 6:
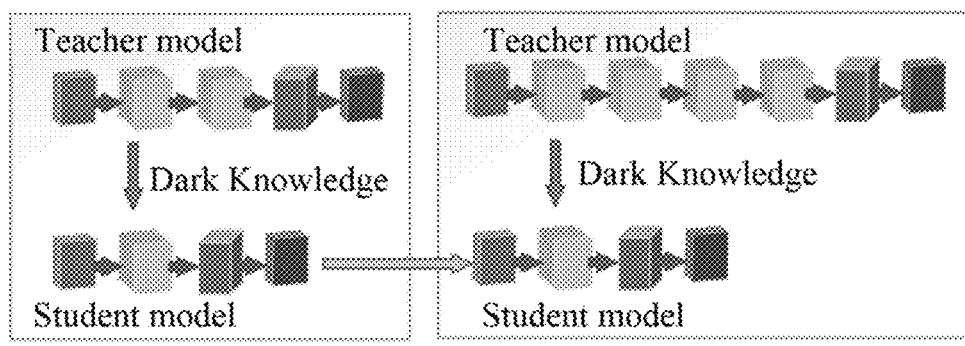
FIG. 6 is a schematic structural diagram of a multi-teacher multi-step knowledge distillation network.
Figure 7:
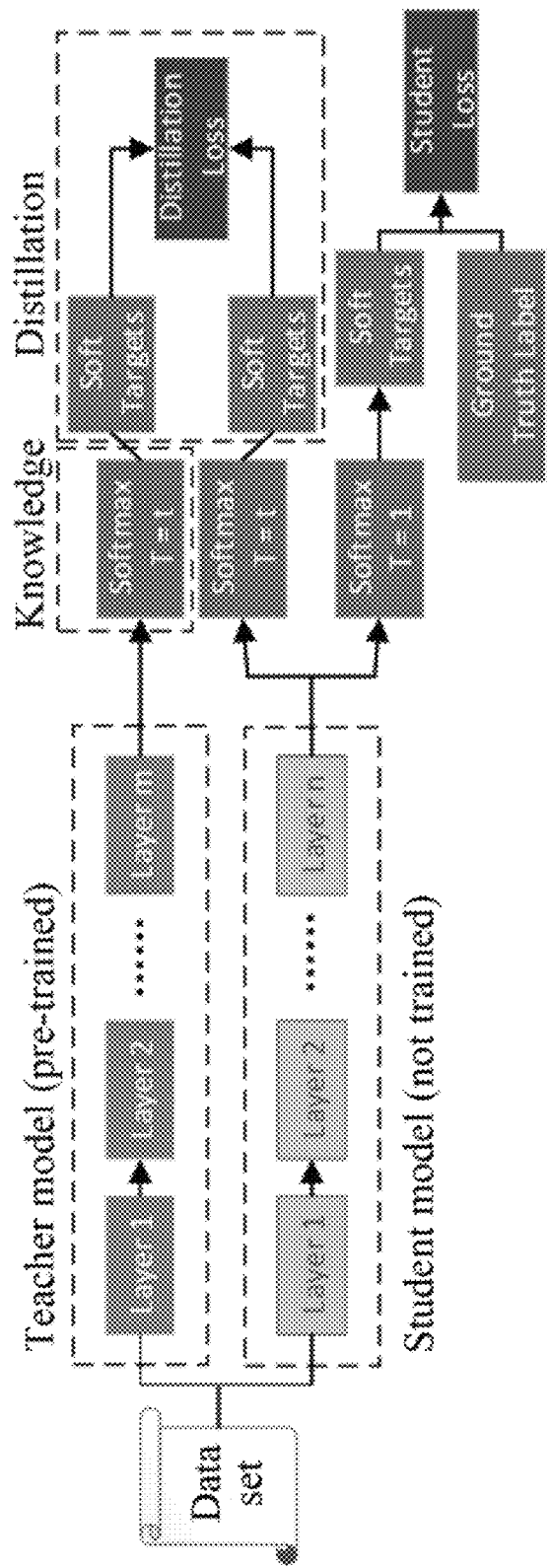
FIG. 7 is a schematic structural diagram of a knowledge distillation network.

The importance of each channel of each layer of the original model is calculated, as shown in FIG. 3, and a computational formula is as shown in Formula (1).

$$H = \Sigma_{i=0}^{255} p_i \log p_i \quad (1)$$

S202. Structure search pruning is performed in coarse-grained search space by using a coarse-grained pruning module.

The search space is restricted, and the search space range is restricted through a data set and prior knowledge, and equal divisions are intercepted in the search space range by means of 4/8/16 equal division as the coarse-grained search space. The form of the search space is coarse_space=$[c_1, c_2, \ldots, c_i, \ldots, c_n]$, $c_i$ represents the search range of the ith layer, with a form of $c_i=[c_{i1}, c_{i2}, \ldots, c_{ij}, \ldots, c_{im}]$, and $c_{ij}$ represents the number of the jth channels in the ith layer.

For structure search pruning, the key is to ensure that a model structure has high precision and compression rate and accelerated computation. When using a differential evolution algorithm for structure pruning, an objective function determines an evolution direction of an entire population, so the design of the objective function needs to be considered from the above three aspects. The objective function of the present disclosure is designed to be minimized in errors, the number of parameters and the sum of computations, and it is necessary to set preferences for these three parts respectively to ensure that the search pruning can be more biased towards a certain respect, because the degrees of change after models are pruned are not the same.

Coarse-grained structure search pruning is performed with reference to FIG. 3.

3 channel structures are randomly generated in search space, and the original model is pruned according to the importance from high to low to obtain 3 models, which form a population as an initial parent.

Individual members of the initial parent are trained, and then the fitness of each model is obtained according to Formula (2).

$$f(c) = \operatorname{argmin}_C \left( \alpha_1 \left( 1 - acc(N(C, D_{train}), D_{test}) + \alpha_2 \frac{\|P_{cur}\|}{\|P_{org}\|} + \alpha_3 \frac{M_{cur}}{M_{org}} \right) \right) \quad (2)$$

where $\alpha_1$ has the maximum value to ensure that the model generated by search pruning has a high precision. $\alpha_2$ and $\alpha_3$ are set between 0.1-0.3.

A variant individual h is generated by Formula (3) and Formula (4).

$$\begin{cases} h_d = m_{f_{min}} - m_{f_{mid}} \\ l_d = m_{f_{mid}} - m_{f_{max}} \\ mask = h_d * l_d \end{cases} \quad (3)$$

$$h = \begin{cases} m_{f_{min}} + s, & \text{if } mask > 0 \text{ and } h_d > 0 \\ m_{f_{min}} - s, & \text{if } mask > 0 \text{ and } h_d < 0 \\ m_{f_{min}} + randn, & \text{if } mask < 0 \end{cases} \quad (4)$$

Crossover individuals are generated through crossover operations to form a variant population, and the fitness of individuals in a crossover population is obtained by Formula (2).

The optimal 3 individuals between a current population and the crossover population are selected through selection operations as a new generation of parents.

Multiple iterations are performed according to the flow in FIG. 3 to obtain multiple network structures near an optimal structure, and the number of iterations is generally set between 3 and 5.

S203. On the basis of coarse-grained pruning, structure search pruning is performed in fine-grained search space by using a fine-grained pruning module.

In the coarse-grained pruning, 3 neural network structures with the smallest objective function value are selected as initial parents of fine-grained structure search pruning.

The maximum value and the minimum value of each layer of channels are obtained from optimal 3 individuals, and search space for fine-grained pruning is built according to a granularity of 1.

Change scales s in the variant individual are all set to 1.

Fine-grained structure search pruning is performed according to the flow shown in FIG. 3, and an optimal neural network structure is obtained under the guidance of objective function formula (2).

S204. Knowledge distillation is performed on the optimal network structure by using a multi-step distillation module.

First teacher models are selected and sorted. Models with the smallest fitness of each generation are selected as the teacher models, and the teacher models are sorted according to the fitness thereof in a descending order.

Starting from the model with the greatest fitness, these models are used as teacher models successively and perform knowledge distillation network training separately with a student model. A loss function is as shown in Formula (5).

$$L = \lambda \cdot T^2 \cdot L_{soft} + (1-\lambda) L_{hard} \quad (5)$$

After all the selected models have participated in the knowledge distillation network training, the original model is selected as the teacher model to supervise the student model to perform the final knowledge distillation training, and finally the optimal model with the accuracy restored is obtained.

In order to facilitate the understanding of the structure search pruning flow provided by the embodiments of the present application, illustration is made below with reference to FIG. 3. As shown in FIG. 3, an adaptive high-precision compression method and system based on a convolutional neural network model includes the following steps:

S301. Search space is initialized.

S302. An initial population is initialized.

S303. The fitness of the initial population is calculated.

S304. Whether a set number of iterations has been completed is determined, and when the iterations are completed, step S308 can be performed for fine-tuning of an optimal model, otherwise S305 is performed to generate variant individuals to continue to evolve.

S305. New individuals are generated through variation and the fitness is calculated.

S306. A variant crossover population is generated through crossover, and the fitness is calculated.

S307. Optimal 3 individuals are selected between a current population and the crossover population through selection as a new generation of parents.

S308. An optimal individual is selected for fine-tuning.

After using the model compression system to compress the facial expression recognition network, both the number of computational operations and the number of parameters of the model have been greatly reduced. The experimental results are shown in Table 1.

TABLE 1

Compression result of facial expression recognition model

| Model size | Number of parameters (M) | Number of computational operations (GFLOPs) | Precision | After knowledge of distillation |
|---|---|---|---|---|
| Original model −580M | 162.4 | 20.3 | 82.3 | 82.3 |
| Compressed model −60M | 23.6 | 3.2 | 76.4 | 81.8 |

It can be seen from the table that after adaptive pruning, both the number of computational operations and the amount of storage of the model are greatly reduced. The number of computational operations is reduced by 6.34 times, the number of parameters is reduced by 6.88 times, and the model size is compressed from the original 580 M to 60 M. After performing the knowledge distillation on the optimal model structure, the precision of the compressed model reaches 81.8, which is near the original model accuracy. The effectiveness of the method provided by the present disclosure is verified through experiments. The present disclosure can effectively reduce the number of parameters and the number of computational operations of the model, thereby realizing the deployment of the model on the embedded platform.

The above-mentioned embodiments are preferred implementations of the present disclosure, but the present disclosure is not limited by the above-mentioned embodiments. Any changes and modifications made by other persons skilled in the art without departing from the spirit and scope of the present disclosure shall fall within the protection scope of the present disclosure. Therefore, the protection scope of the present disclosure should depend on the protection scope of the claims.

What is claimed is:

1. A facial expression recognition method, the method comprising:

obtaining sample images, marking facial expressions to be recognized in the sample images, and dividing the sample images into a train set and a test set;

performing scaling, rotation, cropping, and normalization operations on the sample images, and then unify image sizes;

building a facial expression recognition neural network, wherein the neural network has more than 40 layers, and a neural network combining VGG and Resnet is used;

training the neural network built in the building step with the sample images obtained in the performing step to obtain an original neural network;

compressing the original neural network obtained in the training step; and performing facial expression recognition with the neural network that has been compressed in the compressing step;

wherein compressing the original neural network obtained in the training step comprises:

training an original model on a train data set, and calculating importance of each channel of each layer of the original model on an importance evaluation data set;

performing structure search pruning in coarse-grained search space to obtain a near-optimal model structure, according to a designed differential evolution pruning algorithm;

performing fine-grained structure search on a basis of coarse-grained pruning to obtain an optimal model structure, according to the designed differential evolution pruning algorithm; and performing knowledge distillation on the optimal model structure obtained by pruning to obtain a compression model with improved precision, according to a designed multi-step multi-teacher distillation method;

wherein performing fine-grained structure search on the basis of coarse-grained pruning to obtain the optimal model structure, according to the designed differential evolution pruning algorithm comprises:

reducing the range of the search space, and setting both a search range granularity and a change scale in a variation process to 1, wherein the search space of fine-grained pruning is to select channel structures of optimum three individual in coarse-grained pruning to rebuild, and find the maximum value and minimum value of the number of channels in each layer of the three structures as a search range; and optimum three models of coarse-grained pruning are selected as initial parents of fine-grained pruning, and then adaptive structure search is performed in the search space of fine-grained pruning to obtain an optimal model.

2. The facial expression recognition method according to claim 1, wherein training the original model on the train data set, and calculating importance of each channel of each layer of the original model on the importance evaluation data set comprises:

selecting an entropy as an evaluation criterion for the importance of the channel; the entropy of each output channel of each layer of an original model is calculated through an inference process, and the definition of the channel entropy is as shown in Formula (1);

$$H = \Sigma_{i=0}^{255} p_i \log p_i \quad (1)$$

wherein $p_i$ represents a ratio of the number of values within a range of [i,i+1] in the channel to the total number of values in the channel.

3. The facial expression recognition method according to claim 1, wherein performing structure search pruning in coarse-grained search space to obtain the near-optimal model structure, according to the designed differential evolution pruning algorithm comprises:

S11: setting the maximum value and the minimum value of search space for each layer of neural network according to a data set and prior knowledge, and making 4 equal divisions, or 8 equal divisions, or 16 equal divisions within the set value range, where the form of the search space is coarse_space=$[c_1, c_2, \ldots, c_i, \ldots, c_n]$, $c_i$ represents the search range of the ith layer, with a form of $c_i=[c_{i1}, c_{i2}, \ldots, c_{ij}, \ldots, c_{im}]$, and $c_{ij}$ represents the number of the jth channels in the ith layer;

S12: setting an objective function as shown in Formula (2):

$$f(C) = \mathrm{argmin}_C \left( \alpha_1 \left(1 - acc(N(C, D_{train}), D_{test}) + \alpha_2 \frac{\|P_{cur}\|}{\|P_{org}\|} + \alpha_3 \frac{M_{cur}}{M_{org}} \right) \right) \quad (2)$$

where $acc(N(C,D_{train}), D_{test})$ represents the accuracy of a pruning network with a channel structure C tested on a test data set $D_{test}$ after being trained on a train data set $D_{train}$; $M_{cur}$ and $P_{cur}$ respectively represent the number of computational operations and the number of parameters of a model with a channel structure C, $M_{org}$ and $P_{org}$ respectively represent the number of computational operations and the number of parameters of the original model; the specific form of the channel structure C is $[c_1, c_2, \ldots, c_n]$, where $c_i$ represents the number of channels in the ith layer;

wherein $\alpha_1$, $\alpha_2$, and $\alpha_3$ respectively represent the preferences of the error rate, the number of parameters and the number of computational operations, and the sum of these three coefficients is 1, as shown in formula (3); and $$\alpha_1 + \alpha_2 + \alpha_3 = 1 \quad (3)$$

S13: generating a variant individual through the changing trends of optimal three individuals and an optimal individual, and obtaining a global optimum through a local optimum, wherein the generation of the variant individual is as shown in Formulas (4) and (5);

$$\begin{cases} h_d = m_{f_{min}} - m_{f_{mid}} \\ l_d = m_{f_{mid}} - m_{f_{max}}, \\ \mathrm{mask} = h_d * l_d \end{cases} \quad (4)$$

$$h = \begin{cases} m_{f_{min}} + s, & \text{if mask} > 0 \text{ and } h_d > 0 \\ m_{f_{min}} - s, & \text{if mask} > 0 \text{ and } h_d < 0, \\ m_{f_{min}} + \mathrm{randn}, & \text{if mask} < 0 \end{cases} \quad (5)$$

wherein, $m_{f_{min}}$, $m_{f_{mid}}$, and $m_{f_{max}}$ represent three individuals with the lowest fitness value in a current population, and the change trend of the population and the generation of the variant individual h are determined by the three; s represents a channel change scale of each layer, which is set according to the number of equal divisions in a specific form $[s_1, s_2, \ldots, s_i, \ldots, s_n]$, and $s_i$ represents a change scale of the ith layer; and randn represents a random value in the search space; and S14: performing adaptive structure search pruning according to the coarse-grained search space, the objective function and the evolution mode determined from S11 to S13.

4. The facial expression recognition method according to claim 3, wherein performing knowledge distillation on the optimal model structure obtained by pruning to obtain the compression model with improved precision, according to the designed multi-step multi-teacher distillation method comprises:

using an optimal model of fine-grained pruning as a student model $N_s$, using a pruned network model generated in each generation except the optimal model and an original model as teacher models, and using the teacher model to supervise the student model for knowledge distillation network training; and in the knowledge distillation training, using the teacher models selected to participate in the knowledge distillation training in multiple steps in sequence, wherein there is only one teacher model in the network at a time, and after one stage of training is completed, the teacher model is replaced to perform the knowledge distillation network again;

in the knowledge distillation network training, the teacher models selected participate in the training according to an established order, and the original model is the last one; the sequence is in a descending order based on the objective function (2) of pruning;

a loss function of the knowledge distillation training is as shown in Formula (6);

$$L = \lambda \cdot T^2 \cdot L_{soft} + (1-\lambda) L_{hard} \qquad (6)$$

where $\lambda$ is a weight coefficient, T is a temperature, $L_{soft}$ is a loss between the student model and the teacher model, and $L_{hard}$ is a loss between the student model and a truth label.

* * * * *